(12) United States Patent
Mizuno

(10) Patent No.: US 12,373,244 B2
(45) Date of Patent: Jul. 29, 2025

(54) OPERATION MANAGEMENT APPARATUS AND METHOD

(71) Applicant: Hitachi, Ltd., Tokyo (JP)

(72) Inventor: Jun Mizuno, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 378 days.

(21) Appl. No.: 18/170,812

(22) Filed: Feb. 17, 2023

(65) Prior Publication Data

US 2024/0095064 A1    Mar. 21, 2024

(30) Foreign Application Priority Data

Sep. 20, 2022   (JP) .................................. 2022-149374

(51) Int. Cl.
G06F 9/44      (2018.01)
G06F 9/48      (2006.01)
G06F 11/34     (2006.01)

(52) U.S. Cl.
CPC ........ *G06F 9/4875* (2013.01); *G06F 11/3409* (2013.01)

(58) Field of Classification Search
CPC ....................................................... G06F 48/75
USPC ......................................................... 718/107
See application file for complete search history.

(56) References Cited

U.S. PATENT DOCUMENTS

| | | | |
|---|---|---|---|
| 2016/0085590 A1* | 3/2016 | Yamasaki | G06F 11/32 718/104 |
| 2017/0068603 A1* | 3/2017 | Tai | G06F 11/1471 |
| 2019/0171477 A1 | 6/2019 | Caradonna et al. | |
| 2021/0011816 A1* | 1/2021 | Mitkar | G06F 11/301 |

* cited by examiner

*Primary Examiner* — Timothy A Mudrick
(74) *Attorney, Agent, or Firm* — Volpe Koenig

(57) ABSTRACT

A data migration apparatus and method for performing low cost data migration while preventing stoppages during migration of a job net between cloud services by acquiring an execution schedule of the job net, estimate execution time of each of the jobs, and further estimate volume copy time from a first to a second cloud service regarding each of the volumes to be used; calculate a starting time of each job on the basis of the execution schedule and time of each job; and calculate a starting time of volume copy on the basis of the calculated starting time of day of each job and the volume copy time of each volume, so that the volume copy of each volume from the first to the second cloud service will start at the starting time of the volume copy which has been calculated regarding each relevant volume.

14 Claims, 18 Drawing Sheets

FIG. 3

Work Schedule Retaining TBL 30

| Job Net | Job | Starting Time of Day |
|---|---|---|
| CronJob1 | Job1,job2,job3 | Every Day at 15:00 |
| CronJob2 | Job4,job5,job6,job7 | Every Saturday at 12:00 |
| ... | ... | ... |

Job Volume Mapping TBL 31

| Job | Volume |
|---|---|
| job1 | vol1 |
| job2 | vol2 |
| ... | ... |

Estimated Job Execution Time Retaining TBL 32

| Job | Execution Time |
|---|---|
| job1 | 90min |
| job2 | 30min |
| job3 | 60min |
| ... | ... |

Estimated Volume Copy Time Retaining TBL 33

| Volume | Volume Size | Estimated Copy Time |
|---|---|---|
| vol1 | 30GB | 30min |
| vol2 | 20GB | 20min |
| vol3 | 20GB | 20min |
| ... | ... | ... |

33A — 33B — 33C

Volume Copy Starting Time-of-day Retaining TBL 34

| Volume | Volume Copy Starting Time of Day |
|---|---|
| vol1 | 14:30 |
| vol2 | 16:10 |
| vol3 | 16:40 |
| ... | ... |

34A     34B

Work Schedule Acquisition Processing

Job Volume Mapping Processing

Job Execution Time Estimation Processing

Volume Copy Starting Time-of-day Calculation Processing

Transaction Count Retaining TBL 71

| Volume | Transaction Count |
|---|---|
| vol1 | 30000 |
| vol2 | 20000 |
| vol3 | 20000 |
| ... | ... |

70A     70B

Job Execution Time Estimation Processing

FIG. 22

Time-slot-based Data Transfer Amount Retaining TBL 81

| Time Slot | Data Transfer Amount |
|---|---|
| 00:00-01:00 | 20Gbps |
| 01:00-02:00 | 40Gbps |
| 02:00-03:00 | 40Gbps |
| ... | ... |
| 23:00-24:00 | 30Gbps |

Time-slot-based Data Transfer Amount Retaining Table Creation Processing

START

S100: Acquire transferred data amount and transfer time between migration source cloud and migration destination cloud regarding each time slot S101: Calculate transferred data amount (bps) per unit time regarding each time slot S102: Create time-slot-based data transfer amount retaining TBL based on the calculation result

END

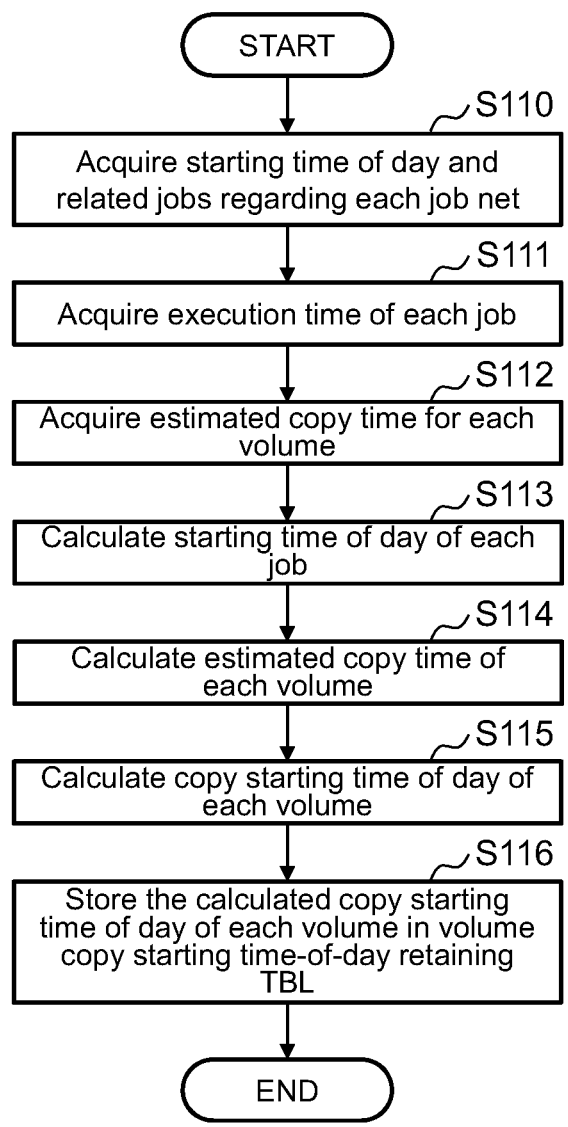

OPERATION MANAGEMENT APPARATUS AND METHOD

TECHNICAL FIELD

The present invention relates to an operation management apparatus and method and is suited for application to, for example, an operation management apparatus for managing migration of data, which is to be used for jobs, between clouds.

BACKGROUND ART

With the spread of cloud services, there has been an increase in cases where a plurality of cloud services are used for each intended usage. For example, if the focus is applied to cost, the cloud services are used in a manner such that an inexpensive cloud service(s) is used for a system(s) with low importance and an expensive cloud service(s) is used for a system(s) with high importance. There is also a usage form to focus on their functional aspect and select a cloud service with a desired function.

Furthermore, regarding batch jobs such as totalization and analysis, they have been often performed in an on-premises environment; however, in recent years, there has been an increase in cases where such batch jobs are executed in cloud.

In light of such circumstances, it is believed that the need for a technology to migrate a batch job, which is executed by an existing cloud service or on-premises, to an appropriate cloud service.

In this case, a container group to execute a batch job to be executed in cloud can be migrated across, for example, a plurality of cloud services in a Kubernetes cluster for several minutes or seconds.

On the other hand, regarding data to be used by a batch job, a data volume is large and the migration of the data thereby requires an enormous amount of time as compared to containers. However, even if a container group for executing the batch job is migrated, the relevant system cannot operate if the data to be used by the batch job does not exist at a migration destination.

Incidentally, in relation to system migration between cloud services, PTL 1 discloses a method for migrating a virtual machine between a plurality of cloud services.

CITATION LIST

Patent Literature

PTL 1: U.S. Unexamined Patent Application Publication No. 2019/0171477

SUMMARY OF THE INVENTION

Problems to be Solved by the Invention

If an invention disclosed in PTL 1 is applied to a system to be implemented, assuming the data migration between the systems, it is assumed that the data will be copied asynchronously to a cloud service at a migration destination. In this case, PTL 1 does not consider time required for the data migration. Therefore, it has a problem that the system may stop without being able to execute a batch job during the data migration.

Moreover, it is also possible to sequentially copy data of a migration object cloud service to the cloud service at the migration destination by means of synchronization copy; however, if this method is employed, there are also problems that a period of time for which a usage fee of cloud storage will be incurred for the cloud services at both the migration source and the migration destination becomes longer or the cost of expanding a network bandwidth to perform the data migration will be incurred.

The present invention was devised in consideration of the above-described circumstances and aims at proposing a data migration apparatus and method capable of performing the data migration at low cost while preventing the system from stopping as caused by the migration of a job net between the cloud services.

Means to Solve the Problems

In order to solve the above-described problem, there is provided according to the present invention a data migration apparatus for migrating data of each of volumes to be used by each of jobs, which constitute a job net executed at a first cloud service that is a migration source, to a second cloud service that is a migration destination, wherein the data migration apparatus includes: a schedule acquisition unit that acquires an execution schedule of the job net; a job execution time estimation unit that estimates execution time of each of the jobs; a volume copy time estimation unit that estimates volume copy time, which is time required for volume copy from the first cloud service to the second cloud service, regarding each of the volumes to be used by each of the jobs; a volume copy starting time-of-day calculation unit that calculates a starting time of day of each job on the basis of the execution schedule of the job net and the execution time of each job and calculates a starting time of day of volume copy of each of the volumes, on the basis of the calculated starting time of day of each job and the volume copy time of each volume, so that the volume copy will terminate before the starting time of day of the relevant job; and a volume copy execution unit that starts the volume copy of each volume from the first cloud service to the second cloud service at the starting time of day of the volume copy which has been calculated regarding the relevant volume.

Furthermore, there is provided according to the present invention a data migration method executed by a data migration apparatus for migrating data of each of volumes to be used by each of jobs, which constitute a job net executed at a first cloud service that is a migration source, to a second cloud service that is a migration destination, wherein the data migration method includes: a first step of acquiring an execution schedule of the job net, estimating execution time of each of the jobs, and further estimating volume copy time, which is time required for volume copy from the first cloud service to the second cloud service, regarding each of the volumes to be used by each of the jobs; a second step of calculating a starting time of day of each job on the basis of the execution schedule of the job net and the execution time of each job and calculating a starting time of day of volume copy of each of the volumes, on the basis of the calculated starting time of day of each job and the volume copy time of each volume, so that the volume copy will terminate before the starting time of day of the relevant job; and a third step of starting the volume copy of each volume from the first cloud service to the second cloud service at the starting time of day of the volume copy which has been calculated regarding the relevant volume.

The data migration apparatus and method according to the present invention can perform volume copying of volumes to be respectively used by the respective jobs, which constitute a job net migrated from a first cloud service to a second cloud service, to the second cloud service before the starting time of day of each job, it is possible to prevent the system from stopping due to the non-existence of data to be used by the relevant job at the second cloud service.

Furthermore, the data migration apparatus and method according to the present invention can shorten the time required to prepare the volumes to be used by the respective jobs, which constitute the migration object job net, at the first and second cloud services, so that it is thereby possible to reduce the usage cost for the first and second cloud services as required for the migration of the job net as a result of the shortened time.

Advantageous Effects of the Invention

According to the present invention, it is possible to implement the data migration apparatus and method capable of performing the data migration at low cost while preventing the system from stopping as caused by the migration of a job net between the cloud services.

BRIEF DESCRIPTION OF DRAWINGS

FIG. 3 is a chart illustrating a structure example of a work schedule retaining table;

FIG. 4 is a chart illustrating a structure example of a job volume mapping table;

FIG. 5 is a chart illustrating a structure example of an estimated job execution time retaining table;

FIG. 6 is a chart illustrating a structure example of an estimated volume copy time retaining table;

FIG. 22 is a chart illustrating a structure example of a time-slot-based data transfer amount retaining table;

FIG. 23 is a flowchart illustrating a processing sequence of time-slot-based data transfer amount retaining table creation processing; and FIG. 24 is a flowchart illustrating a processing sequence of volume copy starting time-of-day calculation processing according to the fourth embodiment.

DESCRIPTION OF EMBODIMENTS

An embodiment of the present invention will be described below in detail with reference to the drawings.

Figure 1:
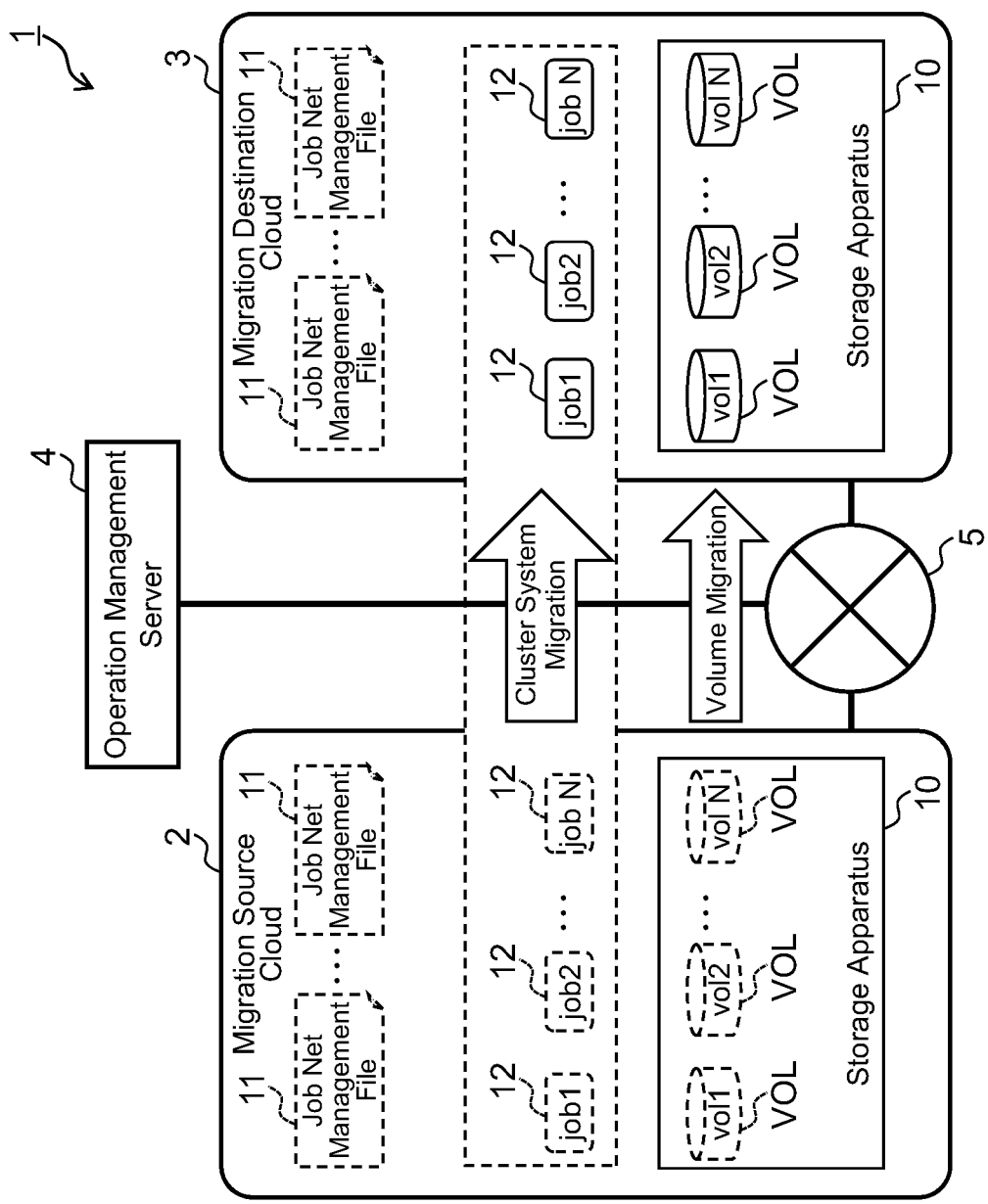
FIG. 1 is a block diagram illustrating the configuration of an information processing system according to first, second, and fourth embodiments.

(1) First Embodiment (1-1) Configuration of Information Processing System According to this Embodiment Referring to FIG. 1, the reference numeral 1 represents an overall configuration of an information processing system according to this embodiment. This information processing system 1 is configured by including a cloud service which becomes a migration source for a batch job as described later (hereinafter referred to as a "migration source cloud") 2, a cloud service which becomes a migration destination of the batch job (hereinafter referred to as "migration destination cloud") 3, and an operation management server 4 for operating the migration source cloud 2 and the migration destination cloud 3. The migration source cloud 2, the migration destination cloud 3, and the operation management server 4 are connected to each other via a network 5 such as the Internet.

The migration source cloud 2 is a cloud service provided by a cloud system including one or a plurality of storage apparatuses 10 which provide volumes VOLs as storage areas to an external business server, etc. not illustrated in the drawing, and one or a plurality of server apparatuses (which are not illustrated in the drawing) for executing a specified job net which is a batch job such as totalization with respect to data stored in the volumes VOLs. In the migration source cloud 2, job net management files 11 of job nets which are regularly executed by the server apparatus(es) are managed respectively.

The job net management file(s) 11: is a file which stores various kinds of information about the relevant job net; and stores information such as starting time of the relevant job net, a job configuration of that job net (the content and sequential order of the respective jobs 12 which constitute the job net), and information indicating which job 12 is associated with which pod (not illustrated in the drawing) in a Kubernetes environment and which pod is using which volume VOL.

Furthermore, the migration destination cloud 3 is also a cloud service provided by a cloud system including one or a plurality of storage apparatuses 10, which provide volumes VOLs to an external business server, etc. not illustrated in the drawing, and one or a plurality of server apparatuses (which are not illustrated in the drawing) for executing a specified job net with respect to data stored in the volumes VOLs.

The system migration is performed on a cluster basis from the migration source cloud 2 to the migration destination cloud 3. Specifically, job net management files 11 of one or a plurality of respective job nets, which constitute the system, and data which is stored in the volume(s) to be used by each of the jobs 12 constituting the migration object job net (volume data) are migrated from the migration source cloud 2. Then, a job net with the same content as that of the job net executed at the migration source cloud 2 is executed at the migration destination cloud 3 on the basis of the migrated job net management files 11 and the migrated volume data.

Figure 2:
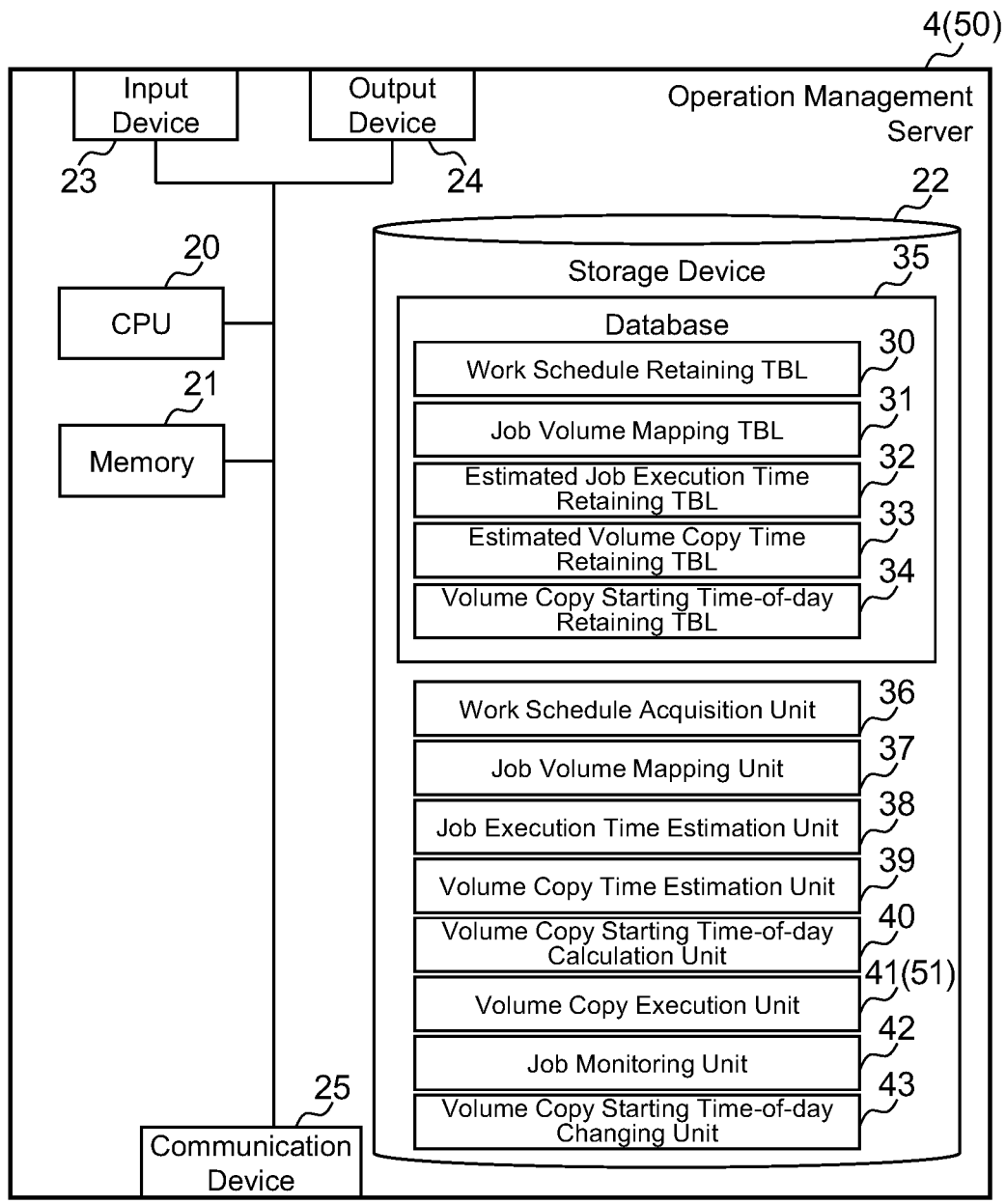
FIG. 2 is a block diagram illustrating the configuration of an operation management server according to first and second embodiments.

The operation management server 4 is a server apparatus which manages the operation of the migration source cloud 2 and the migration destination cloud 3 and is configured, as illustrated in FIG. 2, by including a CPU (Central Processing Unit) 20, a memory 21, a storage device 22, an input device 23, an output device 24, and a communication device 25.

The CPU 20 is a processor that integrally controls actions of the entire operation management server 4. Furthermore, the memory 21 is configured from, for example, a semiconductor memory and is used as a working memory for the CPU 20. The storage device 22 is configured from large-capacity, nonvolatile storage device such as a hard disk drive and an SSD (Solid State Drive) and is used to save various kinds of programs and data which requires long-term storage.

Various kinds of processing of the entire operation management server 4 as described later is executed as the CPU 20 reads a program(s), which is required upon the activation of the operation management server 4 or whenever necessary, from the storage device 22 to the memory 21 and the CPU 20 executes the program which has been read to the memory 21.

The input device 23 is configured from a keyboard, a mouse, etc. and is used by an operator of the operation management server 4 to input necessary information and instructions. The output device 24 is configured from a liquid crystal display, an organic EL (Electro-Luminescence) display, etc. and is used to display necessary information. Incidentally, instead of the input device 22 and the output device 24, a touch panel in which these devices are integrated together may be applied.

The communication device 25 is configured from, for example, an NIC (Network Interface Card) and performs protocol control when communicating with the migration source cloud 2 and the migration destination cloud 3 via the network 5 (FIG. 1).

(1-2) Data Migration Function

Next, an explanation will be provided about a data migration function mounted in the operation management server 4. This data migration function is a function that migrates data of volume(s) VOL(s) to be respectively used by jobs 12, which constitute each of one or a plurality of job nets executed at the migration source cloud 2 and designated by, for example, a user, to the migration destination cloud 3 before a starting time of day of the relevant job 12. Incidentally, it is hereinafter assumed that a migration object job net itself is migrated separately to the migration destination cloud 3 before the starting time of day.

The storage device 22 of the operation management server 4 stores, as illustrated in FIG. 2 and as means for implementing the above-described data migration function: a database 35 which stores a work schedule retaining table 30, a job volume mapping table 31, an estimated job execution time retaining table 32, an estimated volume copy time retaining table 33, and a volume copy starting time-of-day retaining table 34; a work schedule acquisition unit 36; a job volume mapping unit 37; a job execution time estimation unit 38; a volume copy time estimation unit 39; a volume copy starting time-of-day calculation unit 40; a volume copy execution unit 41; a job monitoring unit 42; and a volume copy starting time-of-day changing unit 43.

The work schedule retaining table 30 is a table used to manage the job configuration and starting time of day of a migration object job net recognized based on the job net management file 11 of each job net retained by the migration source cloud 2; and is configured, as illustrated in FIG. 3, by including a job net column 30A, a job column 30B, and a starting time-of-day column 30C. In the work schedule retaining table 30, one record (row) corresponds to one job net executed at the migration source cloud 2.

Then, the job net column 30A stores identification information of the relevant migration object job net executed at the migration source cloud 2; and the job column 30B stores identification information of the respective jobs 12, which constitute the relevant job net (FIG. 1), in sequential order of the jobs 12 executed. Furthermore, the starting time-of-day column 30C stores the starting time of day of the relevant job net, which is set for that job net.

Accordingly, in a case of an example in FIG. 3, it is shown that, for example, a job net called "CronJob1" is a job net that executes three jobs 12, which are called "job1," "job2," and "job3," "every day at 15:00" in the sequential order as listed above.

Furthermore, the job volume mapping table 31 is a table used to manage the correspondence relationship between jobs 12 which constitute the migration object job net executed at the migration source cloud 2, and volumes VOLs used when executing the jobs 12 (FIG. 1).

This job volume mapping table 31 is configured, as illustrated in FIG. 4, by including a job column 31A and a volume column 31B. In the job volume mapping table 31, one record (row) corresponds to the correspondence relationship between one job 12 constituting any one of the job nets executed at the migration source cloud 2, and the relevant volume VOL.

Then, the job column 31A stores identification information of the relevant job 12; and the volume column 31B stores identification information of a volume to be used by that job 12. Therefore, in a case of an example in FIG. 4, it is shown that a volume VOL called "vol1" is allocated to "job1" (the volume called "vol1" is used when the job 12 called "job1" is executed).

Incidentally, FIG. 4 illustrates the example of the case where each job 12 and a volume VOL are in one-on-one relation; however, the job(s) 12 and the volume(s) VOL may be sometimes in a one-on-N, N-on-one, or N-on-M relation.

The estimated job execution time retaining table 32: is a table used to manage time required to execute each of jobs 12 which respectively constitute each job net which is a migration object executed at the migration source cloud 2; and is configured, as illustrated in FIG. 5, by including a job column 32A and an execution time column 32B. In the estimated job execution time retaining table 32, one record (row) corresponds to one job 12 which constitutes the migration object job net executed at the migration source cloud 2.

Then, the job column 32A stores identification information of the relevant job 12; and the execution time column 32B stores execution time required to execute that job 12. This execution time may be an average time of the execution time of that job 12 which has been performed until now or may be estimated time. Therefore, in a case of an example in FIG. 5, it is shown that, for example, the execution time of the job 12 called "job1" is "90 min."

The estimated volume copy time retaining table 33 is a table used to manage a volume size of a volume VOL to be used by each of jobs 12 which constitute the migration object job net executed at the migration source cloud 2, and estimated time required to perform volume copy of that volume VOL to the migration destination cloud 3 (hereinafter referred to as "estimated volume copy time" as appropriate).

This estimated volume copy time retaining table 33 is configured, as illustrated in FIG. 6, by including a volume column 33A, a volume size column 33B, and an estimated copy time column 33C. In the estimated volume copy time retaining table 33, one record (row) corresponds to one volume VOL used by one job 12 which constitutes the migration object job net.

Then, the volume column 33A stores identification information of the relevant volume VOL; and the volume size column 33B stores a volume size (capacity) of that volume VOL. Furthermore, the estimated copy time column 33C stores estimated volume copy time which is required to perform the volume copy of the volume VOL from the migration source cloud 2 to the migration destination cloud 3. A method for calculating this estimated volume copy time will be explained later.

Therefore, in a case of an example in FIG. 6, it is shown that a volume VOL called "vol1" in the migration source cloud 2 has the volume size of "30 GB" and it takes "30 min" to perform the volume copy from the migration source cloud 2 to the migration destination cloud 3.

Figures 7, 8:
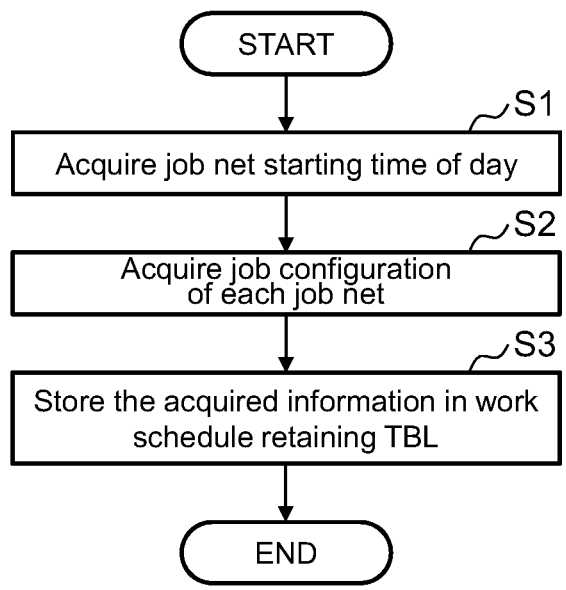
FIG. 7 is a chart illustrating a structure example of a volume copy starting time-of-day retaining table.
FIG. 8 is a flowchart illustrating a processing sequence of work schedule acquisition processing.

The volume copy starting time-of-day retaining table 34 is a table used to manage the time of day when the volume copy of each volume VOL from the migration source cloud 2 to the migration destination cloud 3 should be started, which is calculated by the volume copy starting time-of-day calculation unit 40 (FIG. 2) as described later; and is configured, as illustrated in FIG. 7, by including a volume column 34A and a volume copy starting time-of-day column 34B.

Then, the volume column 34A stores identification information of a volume VOL to be used by any one of jobs 12 which constitute the migration object job net; and the volume copy starting time-of-day column 34B stores the time of day calculated by the volume copy starting time-of-day calculation unit 40 as the time of day when the volume copy of the relevant volume VOL should be started.

Therefore, in a case of an example in FIG. 7, it is shown that regarding the volume VOL called "vol1," the volume copy from the migration source cloud 2 to the migration destination cloud 3 should be started at "14:30" as calculated by the volume copy starting time-of-day calculation unit 40.

Meanwhile, the work schedule acquisition unit 36 (FIG. 2) is a program having a function that acquires the job configuration and the starting time of day of each job net, which is a migration object retained by the migration source cloud 2, from the job net management file 11 of each migration object job net. The work schedule acquisition unit 36 stores these pieces of acquired information in the work schedule retaining table 30 (FIG. 3).

Furthermore, the job volume mapping unit 37 (FIG. 2) is a program having a function that identifies a volume VOL to be used by each of jobs 12, which constitute the relevant job net, from the job net management file 11 of each job net which is the migration object. The job volume mapping unit 37 stores the correspondence relationship between each identified job 12 and the volume VOL to be used by that job 12 in the job volume mapping table 31 (FIG. 4).

The job execution time estimation unit 38 (FIG. 2) is a program having a function that estimates the next execution time of each of the jobs 12, which constitute the migration object job net, on the basis of a log which was recorded when each job 12 was executed in the past and which is managed by the migration source cloud 2. The job execution time estimation unit 38 stores the estimated execution time of each job 12 (hereinafter referred to as the "estimated execution time") in the estimated job execution time retaining table 32 (FIG. 5).

Furthermore, the volume copy time estimation unit 39 (FIG. 2) is a program having a function that estimates volume copy time which is required to copy each volume VOL, which is to be used by each job 12 that is a migration object at the migration source cloud 2, to the migration destination cloud 3. The volume copy time estimation unit 39 stores the estimated volume copy time of each volume VOL (the estimated volume copy time) in the estimated volume copy time retaining table 33 (FIG. 6).

The volume copy starting time-of-day calculation unit 40 (FIG. 2) is a program having a function that calculates the starting time of day of the volume copy of each volume VOL, which is to be used by each of the jobs 12 constituting the migration object job net, to the migration destination cloud 3 (hereinafter referred to as "volume copy starting time of day"). Practically, the volume copy starting time-of-day calculation unit 40 calculates the volume copy starting time of day of the relevant volume(s) VOL so that the volume copy of the volume(s) VOL to be used by the relevant job 12 to the migration destination cloud 3 will be finished before the job 12 migrated to the migration destination cloud 3 will be executed at the migration destination cloud 3. Then, the volume copy starting time-of-day calculation unit 40 stores the calculated volume copy starting time of day of each volume VOL in the volume copy starting time-of-day retaining table 34 (FIG. 7).

The volume copy execution unit 41 is a program having a function that executes the volume copy of the relevant volume VOL to the migration destination cloud 3 at its volume copy starting time of day according to the volume copy starting time of day of each volume VOL which is stored in the volume copy starting time-of-day retaining table 34.

Moreover, the job monitoring unit 42 is a program having a function that, after the migration of a job net from the migration source cloud 2 to the migration destination cloud 3, monitors an execution status of the respective jobs 12, which constitute that job net executed at the migration destination cloud 3, and estimates actual execution time of these jobs 12 at the migration destination cloud 3.

Furthermore, the volume copy starting time-of-day changing unit 43 is a program having a function that, if there is a lag between the actual execution time of a job 12 estimated by the job monitoring unit 42 and the estimated execution time of that job 12 calculated by the job execution time estimation unit 38, changes the volume copy starting time of day of a volume VOL, which is to be used by a job to be subsequently executed after the above-mentioned job 12 (hereinafter referred to as a "subsequent job") 12, to the migration destination cloud 3.

For example, if the actual execution time of the job 12 estimated by the job monitoring unit 42 is shorter than the estimated execution time of the job 12 calculated by the job execution time estimation unit 38, the volume copy starting time-of-day changing unit 43 accordingly changes the volume copy starting time of day of the relevant volume VOL stored in the volume copy starting time-of-day retaining table 34 in order to hasten the starting time of day of the volume copy of a volume to be used by the subsequent job 12 to the migration destination cloud 3.

(1-3) Specific Processing Content of Each Program

Next, an explanation will be provided about specific processing content of various kinds of processing executed respectively by the work schedule acquisition unit 36, the job volume mapping unit 37, the job execution time estimation unit 38, the volume copy time estimation unit 39, the volume copy starting time-of-day calculation unit 40, the volume copy execution unit 41, the job monitoring unit 42, and the volume copy starting time-of-day changing unit 43 in relation to the above-described data migration function.

(1-3-1) Work Schedule Acquisition Processing

FIG. 8 illustrates a flow of a series of processing executed by the work schedule acquisition unit 36 (hereinafter referred to as "work schedule acquisition processing") in association with the above-described data migration function. When the input device 23 (FIG. 2) of the operation management server 4 is operated by the user to designate one or a plurality of job nets as a migration object(s) and then inputs that the migration of such job net(s) should be executed, the work schedule acquisition unit 36 starts the work schedule acquisition processing illustrated in this FIG. 8.

Then, the work schedule acquisition unit 36 firstly acquires the starting time of day of the relevant job net, which is managed by the migration source cloud 2 and regarding which an instruction has been issued to perform the migration, from the job net management file 11 of that job net (S1). Furthermore, the work schedule acquisition unit 36 also acquires the identification information of each of jobs 2 which constitute that job net from the job net management file 11 of the migration object job net (S2).

Then, the work schedule acquisition unit 36 subsequently stores the starting time of day of each job net, which is the migration object, acquired in in step S1 and the identification information of the individual jobs 12, which respectively constitute each migration object job net, acquired in step S2 in the work schedule retaining table 30 (FIG. 3) (S3), and then terminates this work schedule acquisition processing.

(1-3-2) Job Volume Mapping Processing

Figure 9:
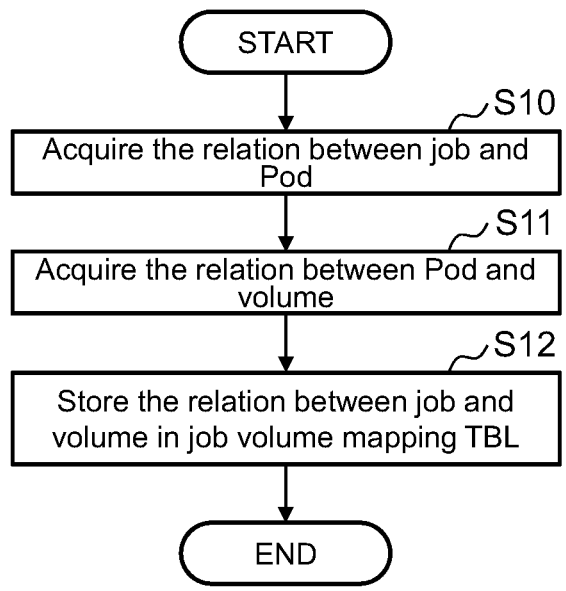
FIG. 9 is a flowchart illustrating a processing sequence of job mapping processing.

FIG. 9 illustrates a flow of a series of processing executed by the job volume mapping unit 37 (FIG. 2) (hereinafter referred to as "job mapping processing") in association with the aforementioned data migration function. The job volume mapping unit 37 identifies the correspondence relationship between the respective jobs 12 of the migration object job net and the volumes VOLs to be used respectively by these jobs 12 in accordance with the processing sequence illustrated in this FIG. 9.

Practically, when the aforementioned work schedule acquisition processing by the work schedule acquisition unit 36 terminates, the job volume mapping unit 37 starts the job volume mapping processing illustrated in this FIG. 9.

Then, the job volume mapping unit 37 firstly refers to the job net management file 11 of each migration object job net acquired by the work schedule acquisition unit 36 and acquires the correspondence relationship between each of the jobs 12, which constitute the relevant job net, and a pod which executes that job 12 (S10).

Furthermore, the job volume mapping unit 37 refers to the job net management file 11 of each job net and acquires the correspondence relationship between each pod for which the relation with the job 12 was acquired in step S10, and the relevant volume VOL (S11).

Subsequently, the job volume mapping unit 37 acquires the correspondence relationship between each relevant job 12 and a volume VOL to be used by that job 12 on the basis of each piece of information acquired in step S10 and step S11 and stores the acquired correspondence relationship between each relevant job 12 and the volume VOL in the job volume mapping table 31 (FIG. 4) (S12). Then, the job volume mapping unit 37 subsequently terminates this job mapping processing.

Incidentally, for example, if this information processing system 1 (FIG. 1) is configured such that the information of the job net management file 11 of each job net executed at the migration source cloud 2 is managed by a job operation management server (which is not illustrated in the drawing) which is separately provided, the job volume mapping unit 37 may acquire the information such as the job configuration and the starting time of day of each job net and the correspondence relationship between each job 12 and its volume VOL from the job operation management server by using an API (Application Programming Interface) or the like.

(1-3-3) Job Execution Time Estimation Processing

Figure 10:
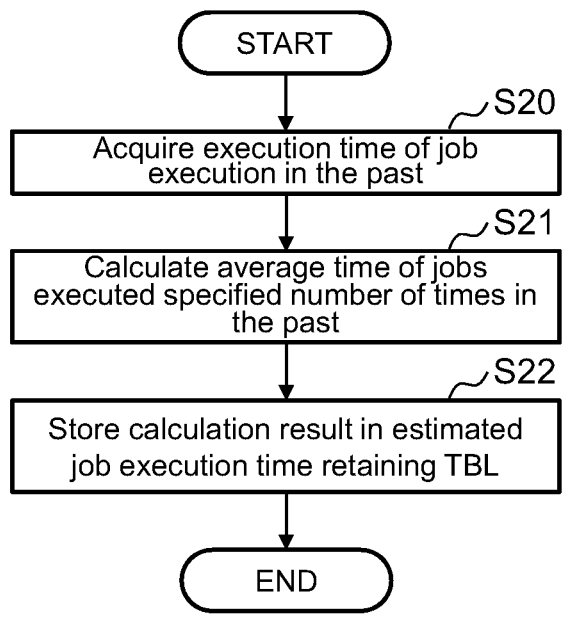
FIG. 10 is a flowchart illustrating a processing sequence of job execution time estimation processing.

FIG. 10 illustrates a flow of a series of processing executed by the job execution time estimation unit 38 (FIG. 2) (hereinafter referred to as "job execution time estimation processing") in association with the aforementioned data migration function. The job execution time estimation unit 38 estimates the execution time of each job 12 of the migration object job net in accordance with the processing sequence illustrated in this FIG. 10.

Practically, the job execution time estimation unit 38 starts this job execution time estimation processing in parallel with the work schedule acquisition processing and the job volume mapping processing described above by the work schedule acquisition unit 36 and the job volume mapping unit 37.

Then, regarding each of the jobs 12 which respectively constitute each migration object job net executed at the migration source cloud 2, the job execution time estimation unit 38 firstly refers to a log which was recorded when the relevant job 12 was executed in the past and which is retained by the migration source cloud 2, and acquires the execution time when the job 12 was executed in the past (required time for the job 12) (S20).

Subsequently, regarding each of the above-described jobs 12, the job execution time estimation unit 38 calculates an average value of the execution time of that job 12 when executed a specified number of times of execution in the past, which was acquired in step S20 (S21).

Furthermore, the job execution time estimation unit 38 stores the average value of the execution time of each job 12 as calculated in step S21, as an estimated value of the execution time of each relevant job 12 (estimated execution time), in the estimated job execution time retaining table 32 (FIG. 5) (S22).

Then, the job execution time estimation unit 38 subsequently terminates this job execution time estimation processing.

(1-3-4) Volume Copy Time Estimation Processing

Figure 11:
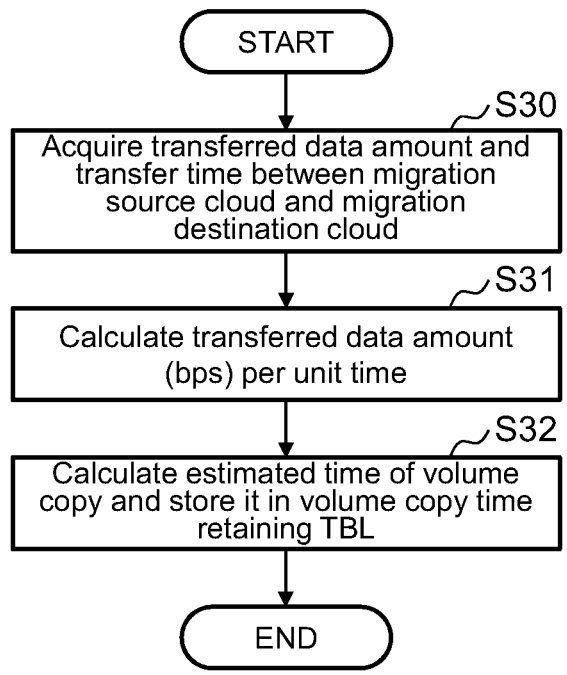
FIG. 11 is a flowchart illustrating a processing sequence of volume copy time estimation processing.

FIG. 11 illustrates a flow of a series of processing executed by the volume copy time estimation unit 39 (FIG. 2) (hereinafter referred to as "volume copy time estimation processing") in association with the aforementioned data migration function. The volume copy time estimation unit 39 calculates the estimated volume copy time of each volume VOL to be used by each of the jobs 12 which constitute the migration object job net in accordance with the processing sequence illustrated in this FIG. 11.

Practically, when the aforementioned job volume mapping processing (FIG. 9) by the job volume mapping unit 37 and the aforementioned job execution time estimation processing (FIG. 10) by the job execution time estimation unit 38 terminate, the volume copy time estimation unit 39 starts the volume copy time estimation processing illustrated in this FIG. 11.

Then, the volume copy time estimation unit 39 firstly refers to a log which is retained by the migration source cloud 2 and the migration destination cloud 3 and which was recorded when data was transferred between the migration source cloud 2 and the migration destination cloud 3 in the past, and acquires a transferred data amount and transfer time at that time (S30).

Subsequently, the volume copy time estimation unit 39 calculates the transferred data amount per unit time (bps) at that time by dividing the transferred data amount by the transfer time, which were acquired in step S30, as indicated in the following expression on the basis of the transferred data amount and the transfer time which were acquired in step S30 (S31).

[Math. 1]
$$\text{Transferred Data Amount per Unit Time} = \frac{\text{Transferred Data Amount}}{\text{Transfer Time}} \quad (1)$$

Next, the volume copy time estimation unit 39 calculates the estimated time required for the volume copy of the relevant volume VOL from the migration source cloud 2 to the migration destination cloud 3 (the estimated volume copy time) by dividing the volume size of that volume VOL by the transferred data amount per unit time, which was calculated in step S30, with respect to each volume VOL to be used by each of the jobs 12 which constitute each migration object job net, as indicated in the following expression.

[Math. 2]
$$\text{Volume Copy Time} = \frac{\text{Volume Size}}{\text{Transferred Data Amount per Unit Time}} \quad (2)$$

Furthermore, the volume copy time estimation unit 39 stores each calculated estimated volume copy time with respect to each volume VOL in the estimated volume copy time retaining table 33 (FIG. 6) (S32). Then, the volume copy time estimation unit 39 subsequently terminates this volume copy time estimation processing.

(1-3-5) Volume Copy Starting Time-of-Day Calculation Processing

Figure 12:
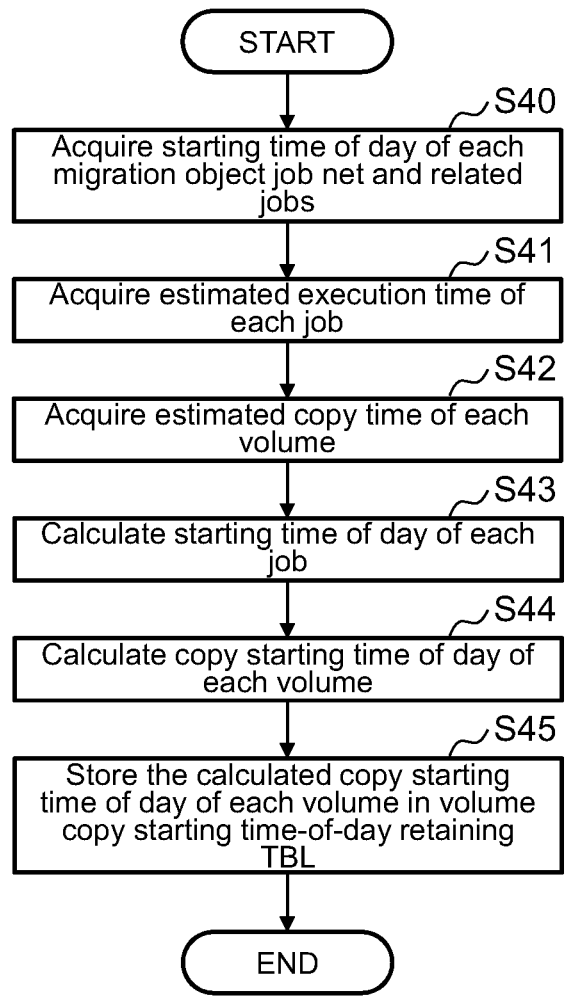
FIG. 12 is a flowchart illustrating a processing sequence of volume copy starting time-of-day calculation processing.

Meanwhile, FIG. 12 illustrates a flow of a series of processing executed by the volume copy starting time-of-day calculation unit 40 (FIG. 2) (hereinafter referred to as "volume copy starting time-of-day calculation processing") in association with the aforementioned data migration function. The volume copy starting time-of-day calculation unit 40 calculates the starting time of day of the volume copy (the volume copy starting time of day) of each volume VOL to be used by each job of the migration object job net from the migration source cloud 2 to the migration destination cloud 3 in accordance with the processing sequence illustrated in this FIG. 12.

Practically, when the aforementioned volume copy time estimation processing (FIG. 11) by the volume copy time estimation unit 39 terminates, the volume copy starting time-of-day calculation unit 40 starts the volume copy starting time-of-day calculation processing illustrated in this FIG. 12.

Then, the volume copy starting time-of-day calculation unit 40 firstly acquires, with respect to each migration object job net, its starting time of day and the identification information of each of the jobs 12, which constitute that job net, respectively from the work schedule retaining table 30 (FIG. 3) (S40).

Subsequently, the volume copy starting time-of-day calculation unit 40 acquires the estimated execution time of each of all the jobs 12, whose identification information was acquired in step S40, from the estimated job execution time retaining table 32 (FIG. 5) (S41). Next, the volume copy starting time-of-day calculation unit 40 searches, regarding all the jobs 12 whose identification information was acquired in step S40, the job volume mapping table 31 (FIG. 4) for the respective volumes VOL to be used by these jobs 12 and acquires the estimated volume copy time of these detected volumes VOL to the migration destination cloud 3 respectively from the estimated volume copy time retaining table 33 (FIG. 6) (S42).

Furthermore, the volume copy starting time-of-day calculation unit 40 calculates the starting time of day of each of these jobs 12 at the migration destination cloud 3 on the basis of the starting time of day of each job net as acquired in step S40 and the estimated execution time of each job 12 as acquired in step S41 (S43).

For example, if the starting time of day of the job net called "CornJob1" is "every day at 15:00" as indicated in FIG. 3 and the estimated execution times of "job1," "job2," and "job3" which constitute this job net are respectively "90 min," "30 min," and "60 min" as indicated in FIG. 5, the volume copy starting time-of-day calculation unit 40 sets the starting time of day of "job1" to "15:00" which is the starting time of day of the job net.

Furthermore, regarding "job2," the volume copy starting time-of-day calculation unit 40 calculates "16:30" as its starting time of day, that is, the time when only "90 min" which is the execution time of "job1" has elapsed since the start of the job net. Furthermore, regarding "job3," the volume copy starting time-of-day calculation unit 40 calculates "17:00" as its starting time of day, that is, the time when only "30 min" which is the execution time of "job2" has elapsed since the start of "job2."

Subsequently, the volume copy starting time-of-day calculation unit 40 calculates the volume copy starting time of day of each volume VOL so that the volume copy of the volume VOL to be used by the relevant job 12 will be completed before the starting time of day of each job 12 on the basis of the starting time of day of each job 12 as calculated in step S43 and the estimated volume copy time of each volume VOL to be used by each job 12 as acquired in step S42 (S44).

Specifically, the volume copy starting time-of-day calculation unit 40 calculates, as the volume copy starting time of day of the relevant volume VOL, a time of day obtained by subtracting the estimated volume copy time of the volume VOL to be used by the relevant job 12 from the starting time of day of that job 12.

For example, if the volume to be used by "job2" which constitutes the job net called "CornJob1" is "vol2" as indicated in FIG. 4 and the estimated volume copy time of "vol2" is "20 min" as indicated in FIG. 6, "16:10" obtained by subtracting "20 min," which is the estimated volume copy time of "vol2," from "16:30" which is the starting time of day of "vol2" calculated as mentioned above is calculated as the volume copy starting time of day of "vol2."

Next, the volume copy starting time-of-day calculation unit 40 stores the volume copy starting time of day of each volume VOL, which was calculated as described above, in the volume copy starting time-of-day retaining table 34 (FIG. 7) (S45) and then terminates this volume copy starting time-of-day calculation processing.

(1-3-6) Volume Copy Execution Processing

Figure 13:
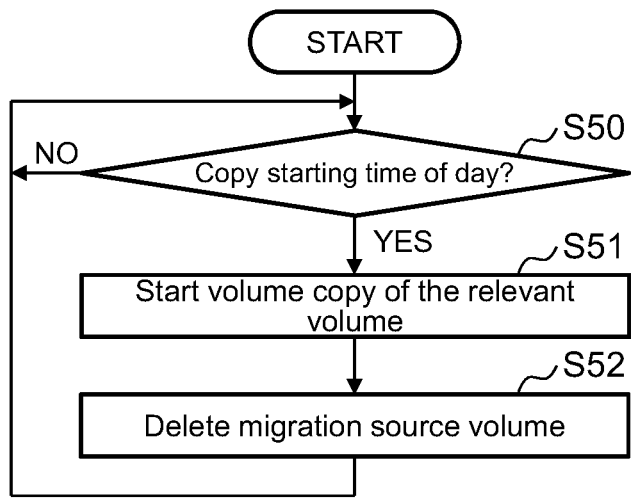
FIG. 13 is a flowchart illustrating a processing sequence of volume copy execution processing.

FIG. 13 illustrates a flow of a series of processing executed by the volume copy execution unit 41 (hereinafter referred to as "volume copy execution processing") in association with the aforementioned data migration function. The volume copy execution unit 41 performs the volume copy of each volume VOL, which is to be used by each of the jobs 12 of the migration object job net, to the migration destination cloud 3 in accordance with the processing sequence illustrated in this FIG. 13.

Practically, when the aforementioned volume copy starting time-of-day calculation processing (FIG. 12) by the volume copy starting time-of-day calculation unit 40 terminates, the volume copy execution unit 41 starts the volume copy execution processing illustrated in this FIG. 13.

Then, the volume copy execution unit 41 waits for the current time of day to become the volume copy starting time of day of any one of the volumes VOLs on the basis of a clock which is not illustrated in the drawing and the volume copy starting time of day of each volume VOL stored in the volume copy starting time-of-day column 34B (FIG. 7) of each record of the volume copy starting time-of-day retaining table 34 (S50).

Then, if the volume copy execution unit 41 eventually obtains an affirmative result in step S50 as the current time of day becomes the volume copy starting time of day of any one of the volumes VOLs, it starts the volume copy of the volume VOL, whose volume copy starting time of day has come, from the migration source cloud 2 to the migration destination cloud 3 (S51).

Specifically, the volume copy execution unit 41 controls the migration source cloud 2 and the migration destination cloud 3 to migrate data of the relevant volume VOL from the migration source cloud 2 to the migration destination cloud 3.

Moreover, if the volume copy execution unit 41 eventually finishes the volume copy of the target volume VOL in step S51, it deletes that volume VOL in the migration source cloud 2 (S52). Furthermore, the volume copy execution unit 41 returns to step S50 and then repeats the processing in step S50 and subsequent steps in the same manner as described above.

Incidentally, after the volume copy starting time-of-day calculation unit 40 terminates the volume copy starting time-of-day calculation processing in FIG. 12, it may create the relevant job net for each volume VOL by recognizing the series of processing in step S51 and step S52 in FIG. 13 as one job net and register the volume copy starting time of day of the relevant volume VOL, which was calculated by the volume copy starting time-of-day calculation processing, as the starting time of day of that job net in the migration source cloud 2 and the migration destination cloud 3. By doing so, the volume copy of each volume VOL in FIG. 13 can be automated.

(1-3-7) Job Monitoring Processing

Figure 14:
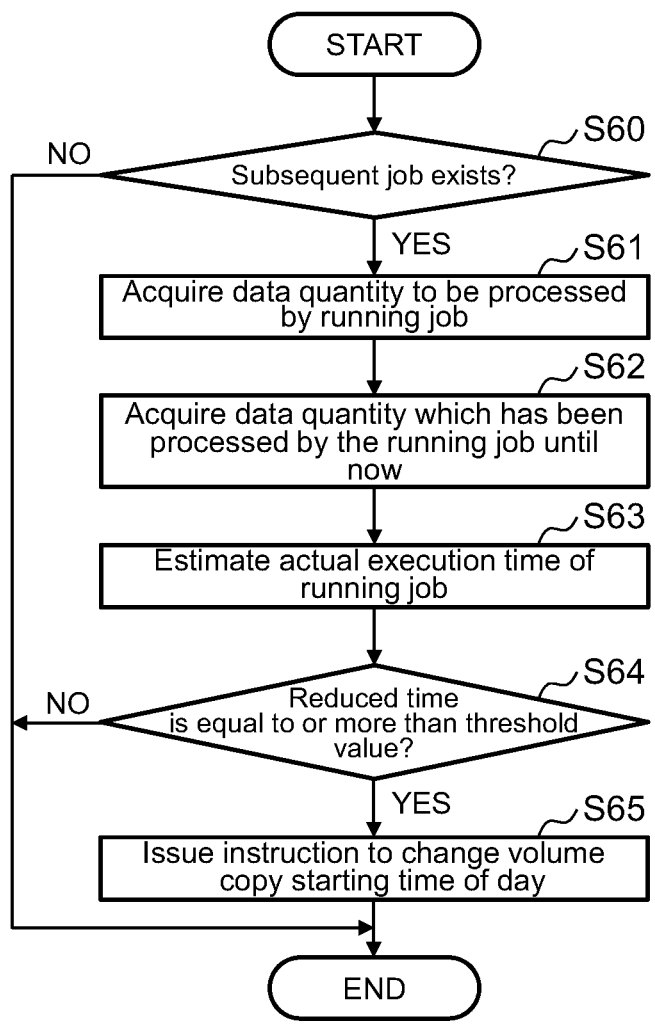
FIG. 14 is a flowchart illustrating a processing sequence of job monitoring processing.

FIG. 14 illustrates a flow of a series of processing executed by the job monitoring unit 42 (FIG. 2) (hereinafter referred to as "job monitoring processing") in association with the aforementioned data migration function. When a certain amount of time has elapsed since the start of any one of the jobs 12, which constitute the job net migrated to the migration destination cloud 3, at the migration destination cloud 3, the job monitoring unit 42 starts this job monitoring processing.

Then, the job monitoring unit 42 firstly judges whether or not there is any subsequent job (subsequent job) 12 following the job which is currently being executed (hereinafter referred to as the "running job) 12 (S60). Then, if the job monitoring unit 42 obtains a negative result in this judgment, it terminates this job monitoring processing.

On the other hand, if the job monitoring unit 42 obtains a negative result in the judgment of step S60, it acquires a data quantity to be processed by the running job 12 on the basis of data stored in the volume VOL which is then used by the running job 12 (S61).

Furthermore, the job monitoring unit 42 acquires the data quantity which has been processed until now by the running job 12 on the basis of a log regarding the processing which is being executed by the running job 12 (S62).

Subsequently, the job monitoring unit 42 estimates actual execution time of the running job 12 on the basis of the data quantity to be processed by the running job 12, which was acquired in step S61, the data quantity which has been processed until now by the running job 12, which was acquired in step S62, and the elapsed time from the start of the running job 12 to the present (S63).

Specifically, the job monitoring unit 42 calculates the actual execution time which is estimated regarding the running job 12 according to the following expression.

[Math. 3]

$$\text{Actual Execution Time of Running Job} = \frac{\text{Elapsed Time from Start of Running Job}}{\text{Processed Data Quantity}} \times (\text{Data Quantity To Be Processed}) \quad (3)$$

Next, the job monitoring unit 42 judges, according to the expression indicated below, whether or not a time difference between the estimated execution time of the running job 12, which was estimated by the job execution time estimation unit 38, and the actual execution time estimated regarding the running job 12, which was calculated in step S63, is less than a preset threshold value (hereinafter referred to as "time difference threshold value") (S64).

[Math. 4]

$$|\text{Execution Time}-\text{Estimated Execution Time}|<\text{Threshold Value} \quad (4)$$

Then, if the job monitoring unit 42 obtains a negative result in this judgment, it terminates this job monitoring processing.

On the other hand, if the job monitoring unit 42 obtains an affirmative result in the judgment of step S64, it issues an instruction to the volume copy starting time-of-day changing unit 43 to change the volume copy starting time of day of the volume VOL to be used by the subsequent job12 of the running job 12 (hereinafter referred to as a "volume copy starting time-of-day changing instruction") (S65) and then terminates this job monitoring processing.

(1-3-8) Volume Copy Starting Time-of-Day Changing Processing

Figure 15:
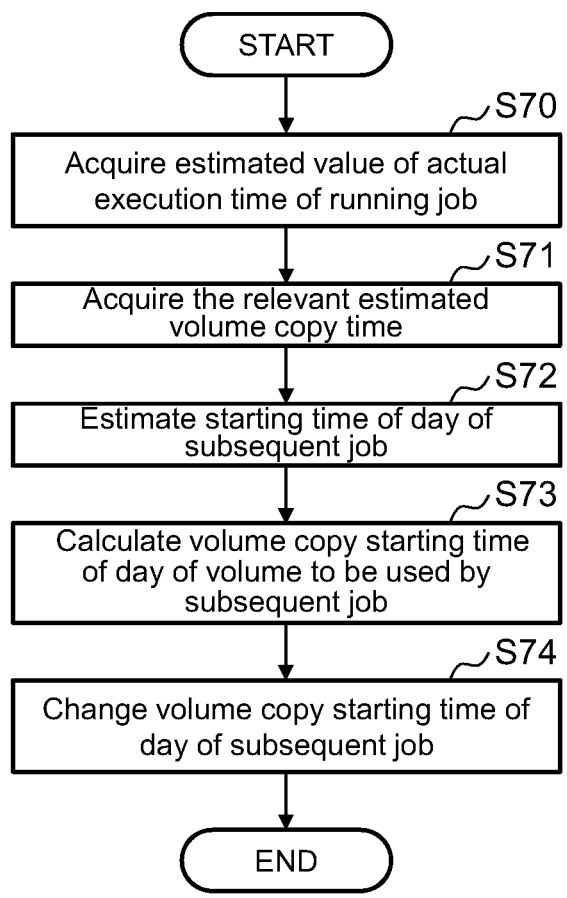
FIG. 15 is a flowchart illustrating a processing sequence of volume copy starting time-of-day changing processing.

FIG. 15 illustrates a flow of a series of processing executed by the volume copy starting time-of-day changing unit 43 (FIG. 2) which has received the volume copy starting time-of-day changing instruction (hereinafter referred to as "volume copy starting time-of-day changing processing").

After receiving the volume copy starting time-of-day changing instruction from the job monitoring unit 42, the volume copy starting time-of-day changing unit 43 executes the volume copy starting time-of-day changing processing for changing (hastening or delaying) the volume copy starting time of day of the subsequent job 12, which is stored in the volume copy starting time-of-day retaining table 34 (FIG. 7), according to an estimated ending time of day of the running job 12 in accordance with the processing sequence illustrated in this FIG. 15.

Practically, after receiving the aforementioned volume copy starting time-of-day changing instruction from the job monitoring unit 42, the volume copy starting time-of-day changing unit 43 starts the volume copy starting time-of-day changing processing illustrated in this FIG. 15 and firstly acquires the estimated value of the actual execution time of the running job 12, which was calculated by the job monitoring unit 42 in step S63 of the job monitoring processing, from the job monitoring unit 42 (S70).

Subsequently, the volume copy starting time-of-day changing unit 43 searches the job volume mapping table 31 for the volume VOL which is being used by the running job 12, and acquires the estimated time of the volume copy of the detected volume VOL (the estimated volume copy time) from the estimated volume copy time retaining table 33 (FIG. 6) (S71).

Next, the volume copy starting time-of-day changing unit 43 calculates the estimated starting time of day of the subsequent job 12 by adding the estimated value of the actual execution time of the running job 12, which was acquired in step S70, to the starting time of day of the running job 12 (S72).

Furthermore, the volume copy starting time-of-day changing unit 43 acquires the estimated time, which is required to perform the volume copy of the volume VOL to be used by the subsequent job 12 from the migration source cloud 2 to the migration destination cloud 3 (the estimated volume copy time), from the estimated volume copy time retaining table 33 and calculates the changed volume copy starting time of day of the relevant volume VOL by subtracting the acquired estimated volume copy time from the starting time of day of the subsequent job 12 which was calculated in step S72 (S73).

Incidentally, the changed volume copy starting time of day which is then calculated is a final time of day to perform the volume copy of the volume VOL to be used by the subsequent job 12 to the migration destination cloud 3 before the subsequent job 12 is started. Therefore, in order to give a little extra time, the volume copy starting time of day of the volume VOL to be used by the subsequent job 12 may be set a required amount of time earlier than the volume copy starting time of day calculated in step S73.

Subsequently, the volume copy starting time-of-day changing unit 43 changes the volume copy starting time of day of the volume VOL stored in the volume copy starting time-of-day retaining table 34 (FIG. 7) (the volume to be used by the subsequent job 12) by rewriting it with the volume copy starting time of day calculated in step S73 (S74). Then, the volume copy starting time-of-day changing unit 43 subsequently terminates this volume copy starting time-of-day changing processing.

(1-4) Advantageous Effects of this Embodiment

With the operation management server 4 according to this embodiment as described above, the volume copy of the volume VOL to be used by each of the jobs 12 constituting the job net, which has been migrated from the migration source cloud 2 to the migration destination cloud 3, to the migration destination cloud 3 can be performed before the starting time of day of each job 12 and it is thereby possible to prevent the occurrence of the system stoppage caused by non-existence of the volume(s) VOL to be used by the job(s) 12, which constitutes the migrated job net, at the migration destination cloud 3.

Furthermore, with this operation management server 4, it is possible to shorten the time required to prepare the volumes VOLs, which are to be used respectively by the respective jobs 12 constituting the migration object job net, at both the migration source cloud 2 and the migration destination cloud 3, so that the usage cost of the migration source cloud 2 and the migration destination cloud 3 as caused by the migration of the job net can be reduced as a result of the above-described shortened time.

Therefore, with this operation management server 4, it is possible to perform the data migration at low cost while preventing the system from stopping due to the migration of the job net between the cloud services.

(2) Second Embodiment

Referring to FIG. 2, the reference numeral 50 represents an operation management server 50 according to a second embodiment which is applied as a whole to the information processing system 1 in FIG. 1 instead of the operation management server 4 according to the first embodiment. This operation management server 50 is configured in a manner similar to the operation management server 4 according to the first embodiment, except for the difference from the operation management server 4 according to the first embodiment, that is, the operation management server 50 is equipped with a cloud bursting function in addition to the data migration function described earlier with regard to the first embodiment.

The cloud bursting function herein means a function that, if the load of a certain cloud system becomes extremely high, causes processing which should be executed at that cloud system to be migrated to, and executed by, another cloud system. In the following description, an explanation will be provided about the case where if the load of the migration source cloud 2 becomes extremely high, a job net which should be executed by the migration source cloud 2 is migrated to, and executed by, the migration destination cloud 3.

Furthermore, it is assumed that this job net itself is migrated separately to the migration destination cloud 3 before its starting time of day; and in the following description, an explanation will be provided about a series of processing for temporarily migrating the respective volumes VOLs to be used by the respective jobs, which constitute this job net, to the migration destination cloud 3 (hereinafter referred to as "cloud bursting data migration support processing").

This cloud bursting data migration support processing is started in response to a request from the migration source cloud 2 in which the input device 23 (FIG. 2) for the operation management server 4 is operated by the user in a specified manner or the load has become extremely high.

Then, when the cloud bursting data migration support processing is started, the work schedule acquisition unit 36, the job volume mapping unit 37, the job execution time estimation unit 38, the volume copy time estimation unit 39, and the volume copy starting time-of-day calculation unit 40 sequentially execute processing similar to the processing content executed by their functional units in relation to the data migration function described earlier with respect to the first embodiment.

Figure 16:
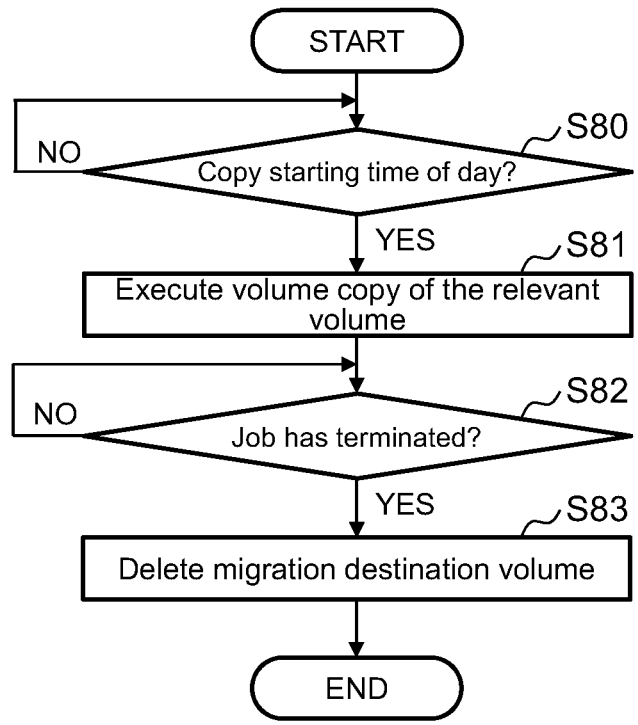
FIG. 16 is a flowchart illustrating a processing sequence of volume copy execution processing according to the second embodiment.

Furthermore, when the volume copy starting time-of-day calculation processing describe earlier with reference to FIG. 12 by the volume copy starting time-of-day calculation unit 40 terminates, the volume copy execution unit 51 (FIG. 2) starts the volume copy execution processing illustrated in FIG. 16.

Then, the volume copy execution unit 51 firstly waits for the current time of day to become the volume copy starting time of day of any one of the volumes VOLs on the basis of a clock which is not illustrated in the drawing and the volume copy starting time of day of each volume VOL stored in the volume copy starting time-of-day column 34B (FIG. 7) of each record of the volume copy starting time-of-day retaining table 34 (S80).

Then, if the volume copy execution unit 51 eventually obtains an affirmative result in step S80 as the current time of day becomes the volume copy starting time of day of any one of the volumes VOLs, it executes the volume copy of the volume VOL, whose volume copy starting time of day has come, from the migration source cloud 2 to the migration destination cloud 3 (S81).

Specifically, the volume copy execution unit 41 controls the migration source cloud 2 and the migration destination cloud 3 to migrate data of the relevant volume VOL from the migration source cloud 2 to the migration destination cloud 3.

Furthermore, when the volume copy of the target volume VOL in step S51 terminates, the volume copy execution unit 51 waits for the job 12 which uses that volume VOL at the migration destination cloud 3 to be finished (S82).

Then, once that job 12 is finished, the volume copy execution unit 51 deletes the volume VOL from the migration destination cloud 3 (S83) and then terminates this volume execution processing.

Incidentally, in this embodiment, this volume copy execution processing is executed for each volume VOL. Specifically, if the volume copy execution unit 51 obtains an affirmative result in step S80, it newly starts the next volume execution processing and executes the volume execution processing, for which the affirmative result is obtained in step S80, in parallel with the newly started volume execution processing.

With the operation management server 50 according to this embodiment having the above-described configuration, it is also possible regarding the cloud bursting function in the same manner as the data migration function to provide the function at low cost while preventing the system from stopping as caused by the migration of the job net between the cloud services.

(3) Third Embodiment

Figure 17:
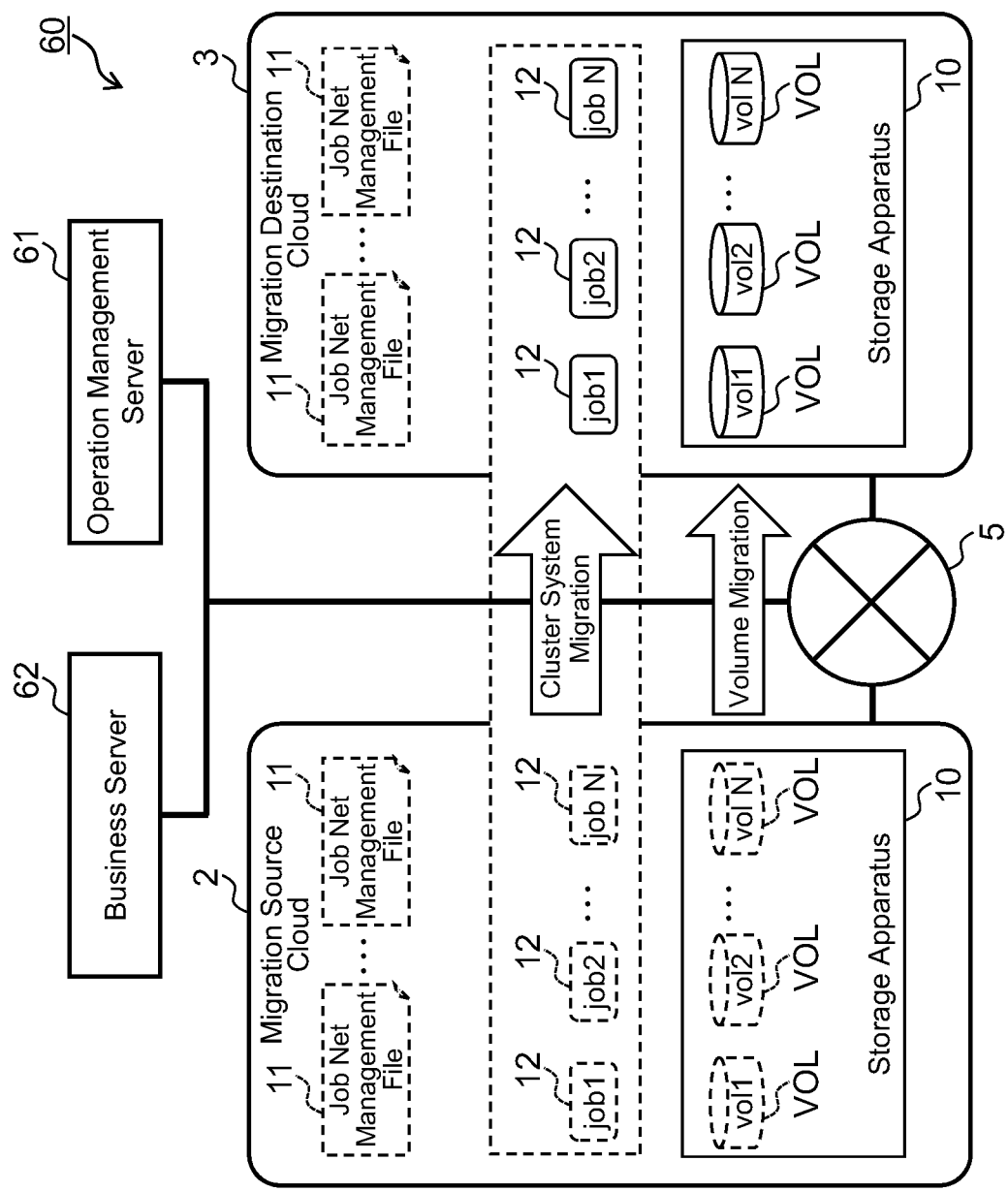
FIG. 17 is a block diagram illustrating the configuration of an information processing system according to a third embodiment.

FIG. 17 which shows parts corresponding to those in FIG. 1 by assigning the same reference numerals as those in FIG. 1 illustrates the configuration of an information processing system 60 according to a third embodiment. This information processing system 60 is configured in a manner similar to the information processing system 1 according to the first embodiment, except for the difference between the content of job execution time estimation processing for estimating the execution time of each of jobs 12, which constitute a migration object job net at an operation management server 61, and the content of the job execution time estimation processing according to the first embodiment described earlier with reference to FIG. 10.

Incidentally, in the following description, it is assumed that with the information processing system 60, a business server 62 performs work transactions and stores thus-obtained transaction data in a volume VOL in the migration source cloud 2. Then, it is assumed that a job net for executing a batch job such as totalization regarding the work transaction data stored in this volume VOL is a migration object job net to be migrated from the migration source cloud 2 to the migration destination cloud 3. Furthermore, in the following description, it is assumed that the migration object job net itself is separately migrated to the migration destination cloud 3 before its starting time of day.

Figure 18:
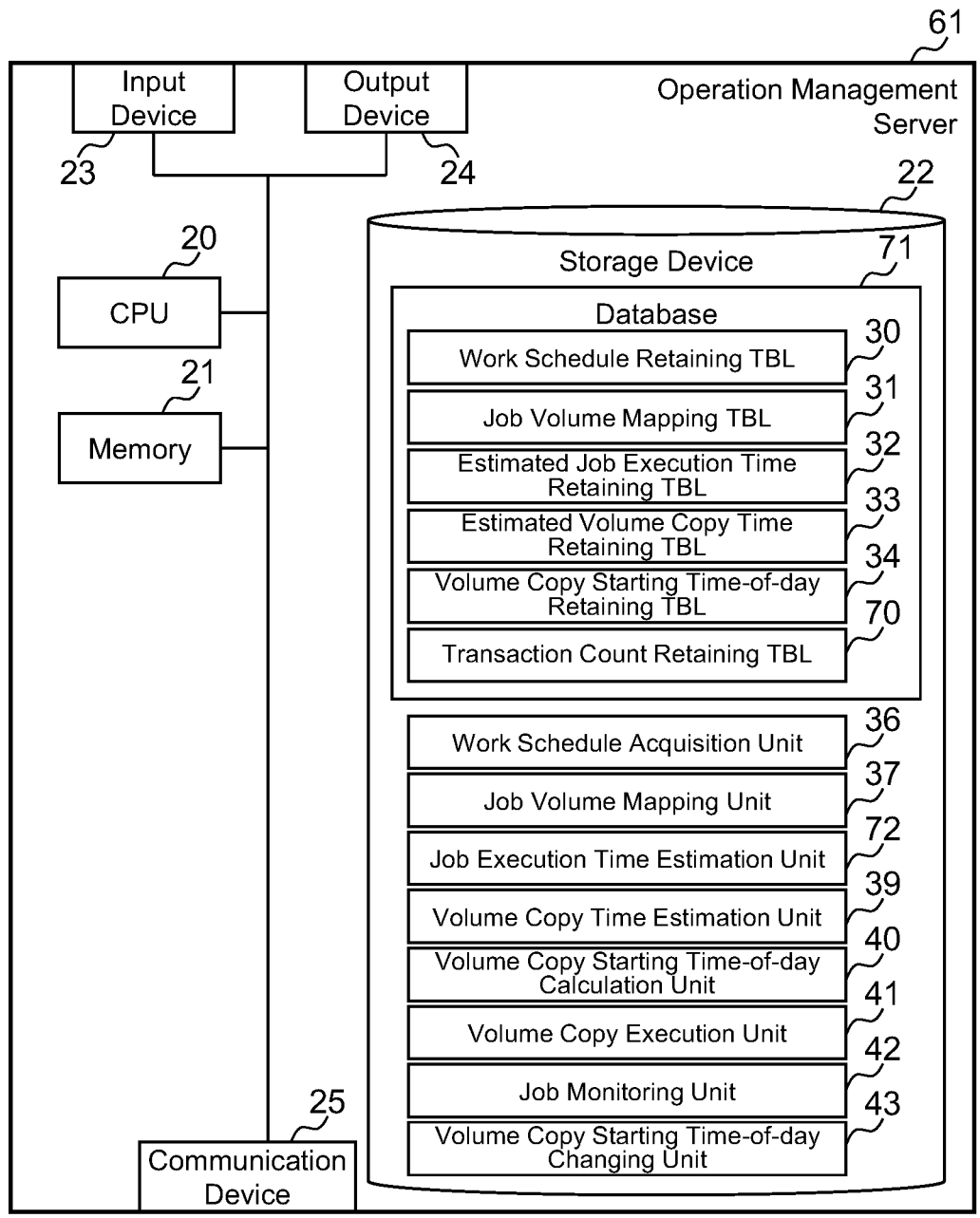
FIG. 18 is a block diagram illustrating the configuration of an operation management server according to the third embodiment.

FIG. 18 which shows parts corresponding to those in FIG. 2 by assigning the same reference numerals as those in FIG. 2 illustrates a configuration example of the operation management server 61 according to this embodiment. With the operation management server 61 according to this embodiment as illustrated in this FIG. 18, a transaction count retaining table 70, in addition to the work schedule retaining table 30, the job volume mapping table 31, the estimated job execution time retaining table 32, the estimated volume copy time retaining table 33, and the volume copy starting time-of-day retaining table 34, is stored in a database 71.

Figures 19, 20:
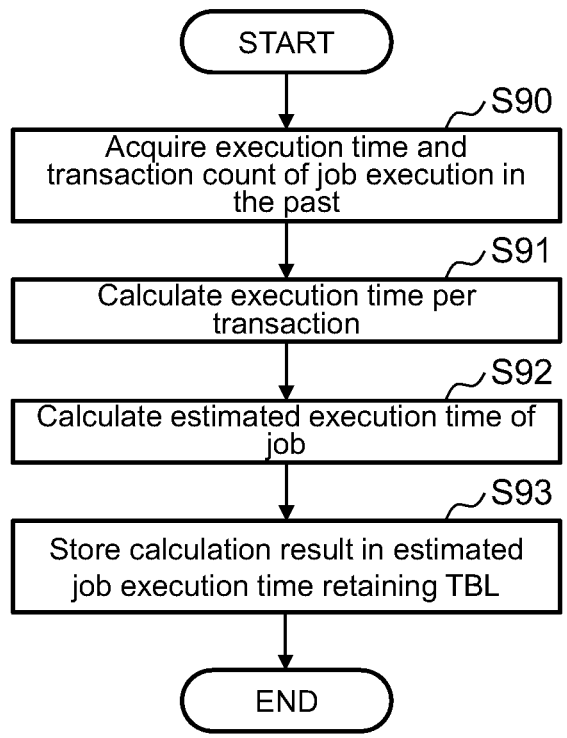
FIG. 19 is a chart illustrating a structure example of a transaction count retaining table.
FIG. 20 is a flowchart illustrating a processing sequence of job execution time estimation processing according to the third embodiment.

This transaction count retaining table 70: is a table used to manage the number of transactions by the business server 62 for each volume 2 in the migration source cloud 2 to use that volume VOL; and is configured, as illustrated in FIG. 19, by including a volume column 70A and a transaction count column 70B. In the transaction count retaining table 70, one record (row) corresponds to one volume VOL 1 for which the business server 62 stores the transaction data.

Then, the volume column 70A stores identification information of the relevant volume VOL; and the transaction count column 70B stores the number of transactions (transaction count) for which the volume is used by the relevant job 12. Therefore, in a case of an example in FIG. 19, it is shown that regarding the relevant job, for example, there were "30000" transactions for which the volume VOL called "vol1" was used. Incidentally, the transaction count for each volume VOL is acquired from the business server 62.

FIG. 20 illustrates specific processing content of the job execution time estimation processing executed by a job execution time estimation unit 72 (FIG. 18) according to this embodiment. The job execution time estimation unit 72 according to this embodiment estimates the execution time of each job 12 of the migration object job net in accordance with the processing sequence illustrated in this FIG. 20.

Practically, the job execution time estimation unit 72 starts this job execution time estimation processing in parallel with the aforementioned work schedule acquisition processing (FIG. 8) and the job volume mapping processing (FIG. 9) by the work schedule acquisition unit 36 and the job volume mapping unit 37.

Then, the job execution time estimation unit 72 firstly refers to a log, which is retained by the migration source cloud 2 and which was recorded when the job 12 was executed in the past, regarding each of the jobs 12 constituting the migration object job net, and acquires the execution time when the relevant job 12 was executed in the past, and the transaction count at that time (S90). The transaction count of this time is also acquired from the business server 62.

Subsequently, the job execution time estimation unit 72 calculates, regarding each job 12, the execution time per transaction for that job 12 according to the expression indicated below on the basis of the execution time and the transaction count when the relevant job 12 was executed in the past, as acquired in S90 (S91).

[Math. 5]
$$\text{Execution Time per Transaction} = \frac{\text{Execution Time of Job}}{\text{Transaction Count}} \quad (5)$$

Next, the job execution time estimation unit 72 calculates, regarding each job 12, the estimated execution time of the job 12 next time by multiplying the execution time per transaction, which was calculated in step S91, by the transaction count regarding the volume VOL to be used by that job 12, which is stored in the transaction count retaining table 70 (S92).

Furthermore, the job execution time estimation unit 72 stores the estimated execution time for each job 12, which was calculated in step S92, in the estimated job execution time retaining table 32 (FIG. 5) (S93), and then terminates this job execution time estimation processing.

With the operation management server 61 according to this embodiment having the above-described configuration, it is possible to estimate the execution time of each job 12 with higher accuracy than the case where an average value of the execution times of the job 12 performed in the past is recognized as the execution time of that job 12 as in the first embodiment.

(4) Fourth Embodiment

Figure 21:
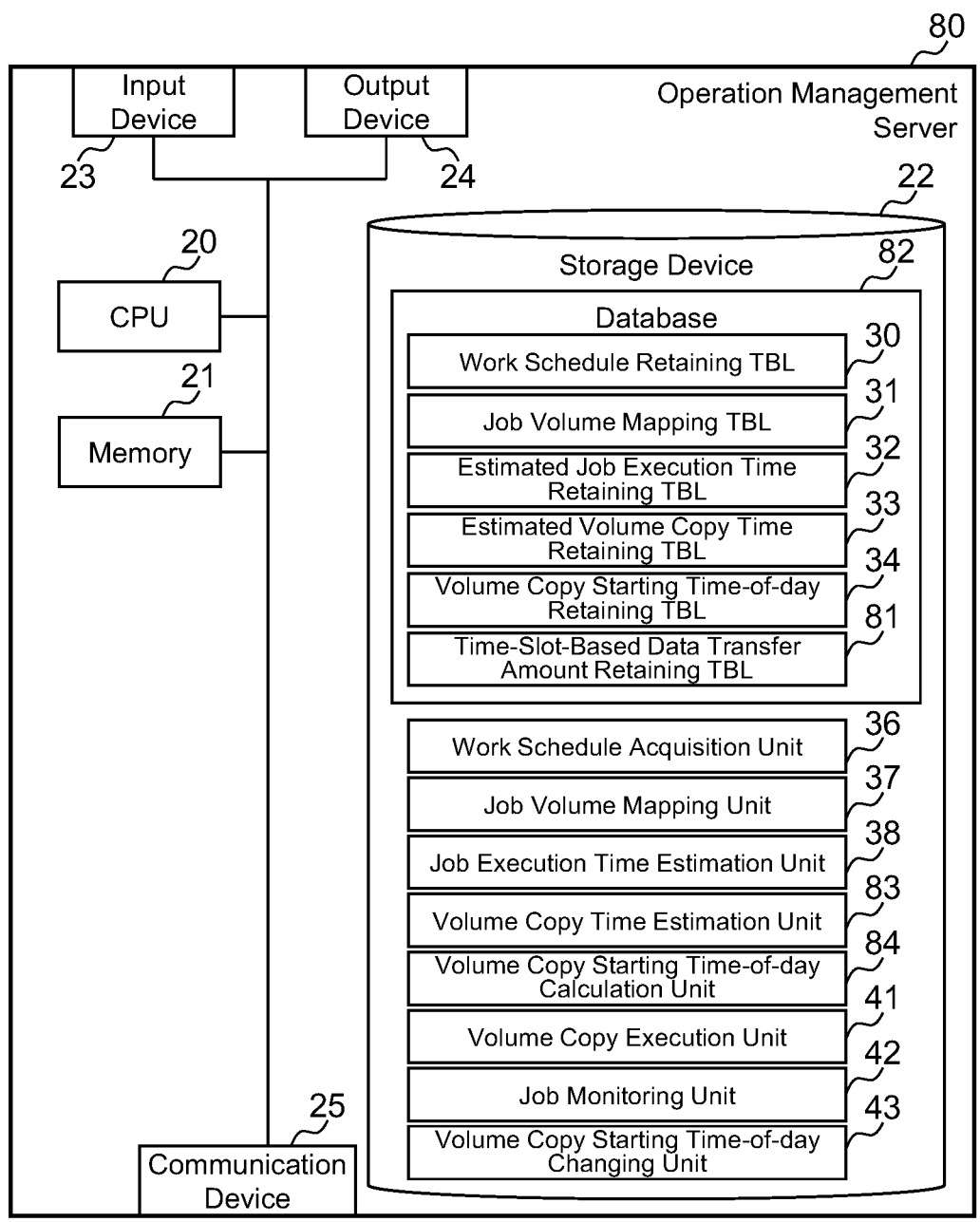
FIG. 21 is a block diagram illustrating the configuration of an operation management server according to the fourth embodiment.

FIG. 21 which shows parts corresponding to those in FIG. 2 by assigning the same reference numerals as those in FIG. 2 illustrates an operation management server 80 according to a fourth embodiment applied to the information processing system 1 in FIG. 1 instead of the operation management server 4 according to the first embodiment. This operation management server 80 is configured in a manner similar to the operation management server 4 according to the first embodiment, except that it is designed to be capable of calculating the volume copy time and the volume copy starting time of day of each volume VOL, which is a copy object, more accurately in consideration of the fact that a speed of data transfer between the migration source cloud 2 and the migration destination cloud 3 varies for each time slot.

Practically, with the operation management server 80 according to this embodiment, a time-slot-based data transfer amount retaining table 81 as illustrated in FIG. 22, in addition to the work schedule retaining table 30, the job volume mapping table 31, the estimated job execution time retaining table 32, the estimated volume copy time retaining table 33, and the volume copy starting time-of-day retaining table 34, is stored in a database 82.

The time-slot-based data transfer amount retaining table 81: is a table used to manage a data transfer amount per unit time for each time slot between the migration source cloud 2 and the migration destination cloud 3; and is configured, as illustrated in FIG. 22, by including a time slot column 81A and a data transfer amount column 81B. In the time-slot-based data transfer amount retaining table 81, one record (row) corresponds to one time slot.

Then, the time slot column 81A stores information indicating the relevant time slot. Furthermore, the data transfer amount column 81B stores an average value of the data transfer amount per unit time which is measured by a volume copy time estimation unit 83 according to this embodiment regarding the relevant time slot. Therefore, in a case of an example in FIG. 22, it is shown that, for example, the data transfer amount per unit time for a time slot "00:00-01:00" is "20 Gbps."

FIG. 23 illustrates time-slot-based data transfer amount retaining table creation processing executed by a volume copy time estimation unit 83 according to this embodiment. The volume copy time estimation unit 83 creates the time-slot-based data transfer amount retaining table 81 described above with reference to FIG. 22 in accordance with the processing sequence illustrated in this FIG. 23.

Practically, when the job volume mapping processing by the job volume mapping unit 37 as described earlier with reference to FIG. 9 and the job execution time estimation processing by the job execution time estimation unit 38 as described earlier with reference to FIG. 10 terminate, the volume copy time estimation unit 83 starts the time-slot-based data transfer amount retaining table creation processing illustrated in this FIG. 23.

Then, the volume copy time estimation unit 83 firstly refers to a log which is retained by the migration source cloud 2 and the migration destination cloud 3 and which was recorded when the data transfer was performed between the migration source cloud 2 and the migration destination cloud 3 in the past and acquires the transferred data amount per unit time for each time slot and the time required for the data transfer (transfer time), respectively (S100).

Subsequently, the volume copy time estimation unit 83 calculates the data transfer amount per unit time for each time slot according to the aforementioned Expression (1) on the basis of the transferred data amount for each time slot and the transfer time which were acquired in step S100 (S101).

Next, the volume copy time estimation unit 83 creates the time-slot-based data transfer amount retaining table 81 by using the data transfer amount per unit time for each time slot which was calculated in step S101 (S102), and then terminates this time-slot-based data transfer amount retaining table creation processing.

Incidentally, the volume copy time estimation unit 83 subsequently executes the volume copy time estimation processing described earlier with reference to FIG. 11; and when doing so, the volume copy time estimation unit 83 estimates the volume copy time of each volume VOL, which is a volume copy object, by using the time-slot-based data transfer amount retaining table 81 created by this time-slot-based data transfer amount retaining table creation processing.

Meanwhile, FIG. 24 illustrates processing content of volume copy starting time-of-day calculation processing executed by a volume copy starting time-of-day calculation unit 84 (FIG. 21) according to this embodiment. The volume copy starting time-of-day calculation unit 84 calculates the starting time of day of the volume copy of each volume VOL to be used by each job 12 of the migration object job net in accordance with the processing sequence illustrated in this FIG. 24.

Practically, when the volume copy time estimation processing (FIG. 11) by the volume copy time estimation unit 83 terminates, the volume copy starting time-of-day calculation unit 84 starts the volume copy starting time-of-day calculation processing illustrated in this FIG. 24.

Then, the volume copy starting time-of-day calculation unit 84 firstly acquires the starting time of day of each migration object job net from the migration source cloud 2 to the migration destination cloud 3 and the identification information of each of jobs 12, which constitute the relevant job net, respectively from the work schedule retaining table 30 (FIG. 3) (S110).

Subsequently, the volume copy starting time-of-day calculation unit 84 acquires execution times of all the jobs 12, regarding which the identification information was acquired in step S110, respectively from the estimated job execution time retaining table 32 (FIG. 5) (S111).

Next, regarding all the jobs 12 whose identification information was acquired in step S110, the volume copy starting time-of-day calculation unit 84 searches the job volume mapping table 31 (FIG. 4) for volumes VOLs to be used by these jobs 12 and acquires estimated volume copy times of these detected volumes VOL to the migration destination cloud 3 from the estimated volume copy time retaining table 33 (FIG. 6) (S112).

Furthermore, the volume copy starting time-of-day calculation unit 84 calculates the starting time of day of each job 12 regarding each migration object job net on the basis of the starting time of day of that job net as acquired in step S110 and the execution times of the respective jobs which constitute that job net as acquired in step S111 (S113).

Subsequently, the volume copy starting time-of-day calculation unit 84 calculates estimated time of the volume copy of each volume VOL to be used by each of the jobs 12, which constitute the relevant job net, to the migration destination cloud 3 (estimated volume copy time) regarding each migration object job net (S114).

Specifically, the volume copy starting time-of-day calculation unit 84 firstly acquires the data transfer amount per unit time for the time slot including the starting time of day of each job 12 as calculated in step S113 from the time-slot-based data transfer amount retaining table 81 (FIG. 22).

Then, the volume copy starting time-of-day calculation unit 84 calculates the estimated time of the volume copy of each volume VOL, regarding each migration object job net, on the basis of the volume size of each volume VOL to be used by each of the jobs 12, which constitute that job net, and the data transfer amount per unit time for each time slot including the starting time of day of each job 12 as acquired in step S113.

Then, the volume copy starting time-of-day calculation unit 84 stores the calculated estimated time of each volume VOL (the estimated volume copy time) in the estimated volume copy time retaining table 33 (FIG. 6).

Next, the volume copy starting time-of-day calculation unit 84 calculates the starting time of day of the volume copy of each volume VOL from the migration source cloud 2 to the migration destination cloud 3 on the basis of the starting time of day of each job 12 as calculated in step S113 and the estimated volume copy time of the volume VOL to be used by each job 12 as acquired in step S114 so that the volume copy of the volume VOL to be used by the relevant job 12 will be completed before the starting time of day of each job 12 (S115).

Specifically, the volume copy starting time-of-day calculation unit 84 calculates the time of day, which is obtained by subtracting the estimated volume copy time of the volume VOL to be used by the job 12 from the starting time of day of the job 12, as the starting time of day of the volume copy of that volume VOL.

Next, the volume copy starting time-of-day calculation unit 84 stores the starting time of day of the volume copy of each volume VOL, which is calculated as described above, in the volume copy starting time-of-day retaining table 34 (FIG. 7) (S116) and then terminates this volume copy starting time-of-day calculation processing.

With the operation management server 80 according to this embodiment having the above-described configuration, it is possible to calculate the volume copy time and the volume copy starting time of day of each volume VOL, which is the copy object, more accurately in consideration of the fact that the data transfer speed between the migration source cloud 2 and the migration destination cloud 3 varies depending on each time slot, and to accordingly prevent, with higher reliability, the system from stopping as caused by the migration of the job net between the cloud services.

(5) Other Embodiments

Incidentally, the aforementioned first to fourth embodiments have described the case where various kinds of programs for implementing the various kinds of functions such as the data migration function (such as the work schedule acquisition unit 36, the job volume mapping unit 37, and the job execution time estimation unit 38) are mounted in the operation management server 4, 50, 61, 80 which is configured of one computer apparatus; however, the present invention is not limited to this example and such various kinds of programs may be distributed and mounted in a plurality of computer apparatuses which constitute a distributed computing system so that the various kinds of functions such as the data migration function will be implemented by the entire distributed computing system.

Furthermore, the aforementioned fourth embodiment has described the case where the estimated time of the volume copy of a volume VOL (the estimated volume copy time) is calculated by the volume copy starting time-of-day calculation unit 84; however, the present invention is not limited to this example and, for example, the processing of step S110 to step S114 in the volume copy starting time-of-day calculation processing described earlier with reference to FIG. 24 may be executed by the volume copy time estimation unit 83.

INDUSTRIAL AVAILABILITY

The present invention can be applied to a wide variety of data migration apparatuses with various configurations which execute the data migration as required for the system migration between the cloud services.

REFERENCE SIGNS LIST 1, 60: information processing system
2: migration source cloud
3: migration destination cloud
4, 50, 61, 80: operation management server
11: job net management file(s)
12: job(s)
20: CPU
30: work schedule retaining table
31: job volume mapping table
32: estimated job execution time retaining table
33: estimated volume copy time retaining table
34: volume copy starting time-of-day retaining table
36: work schedule acquisition unit
37: job volume mapping unit
38, 72: job execution time estimation unit
39, 83: volume copy time estimation unit
40, 84: volume copy starting time-of-day calculation unit
41, 51: volume copy execution unit
42: job monitoring unit
43: volume copy starting time-of-day changing unit
62: business server
70: transaction count retaining table
81: time-slot-based data transfer amount retaining table
VOL: volume(s)

The invention claimed is:

1. A data migration apparatus for migrating data of each of volumes to be used by each of jobs, which constitute a job net executed at a first cloud service that is a migration source, to a second cloud service that is a migration destination,
the data migration apparatus comprising:
a schedule acquisition unit that acquires an execution schedule of the job net;
a job execution time estimation unit that estimates execution time of each of the jobs;
a volume copy time estimation unit that estimates volume copy time, which is time required for volume copy from the first cloud service to the second cloud service, regarding each of the volumes to be used by each of the jobs;
a volume copy starting time-of-day calculation unit that calculates a starting time of day of each job on the basis of the execution schedule of the job net and the execution time of each job and calculates a starting time of day of volume copy of each of the volumes, on the basis of the calculated starting time of day of each job and the volume copy time of each volume, so that the volume copy will terminate before the starting time of day of the relevant job; and
a volume copy execution unit that starts the volume copy of each volume from the first cloud service to the second cloud service at the starting time of day of the volume copy which has been calculated regarding the relevant volume.

2. The data migration apparatus according to claim 1, further comprising:
a job monitoring unit that monitors an execution status of the jobs at the second cloud service; and
a volume copy starting time-of-day changing unit that, if there is a lag between the execution status of the job which is running and the execution time of the job estimated by the job execution time estimation unit, calculates a starting time of day of a subsequent job to be subsequently executed after the job which is running, and changes the starting time of day of the volume copy of the volume to be used by the subsequent job on the basis of the calculated starting time of day of the subsequent job.

3. The data migration apparatus according to claim 1, wherein the job execution time estimation unit estimates an average value of execution time when the job was executed in the past, as the execution time of the job on the basis of a log of the job when executed in the past.

4. The data migration apparatus according to claim 1, wherein after the volume copy of the volume terminates, the volume copy execution unit deletes the volume at the first cloud service.

5. The data migration apparatus according to claim 4, wherein after the execution of the job at the second cloud service terminates, the volume copy execution unit deletes the volume used by the job.

6. The data migration apparatus according to claim 1, wherein the job execution time estimation unit estimates the execution time of the relevant job on the basis of a work transaction count regarding the volume.

7. The data migration apparatus according to claim 1, wherein the volume copy time estimation unit acquires a data transfer amount per unit time for each time slot, and estimates volume copy time of each volume on the basis of the acquired data transfer amount per unit time for each time slot, the starting time of day of each job, and a volume size of each volume to be used by each job, and estimates volume copy time of each volume on the basis of the estimated volume copy time of each volume and the starting time of day of each job.

8. A data migration method executed by a data migration apparatus for migrating data of each of volumes to be used by each of jobs, which constitute a job net executed at a first cloud service that is a migration source, to a second cloud service that is a migration destination, the data migration method comprising:
a first step of acquiring an execution schedule of the job net, estimating execution time of each of the jobs, and further estimating volume copy time, which is time required for volume copy from the first cloud service to the second cloud service, regarding each of the volumes to be used by each of the jobs;
a second step of calculating a starting time of day of each job on the basis of the execution schedule of the job net and the execution time of each job and calculating a starting time of day of volume copy of each of the volumes, on the basis of the calculated starting time of day of each job and the volume copy time of each volume, so that the volume copy will terminate before the starting time of day of the relevant job; and a third step of starting the volume copy of each volume from the first cloud service to the second cloud service at the starting time of day of the volume copy which has been calculated regarding the relevant volume.

9. The data migration method according to claim 8, further comprising a fourth step of monitoring an execution status of the jobs at the second cloud service and, if there is a lag between the execution status of the job which is running and the estimated execution time of the job, calculating a starting time of day of a subsequent job to be subsequently executed after the job which is running, and changing the starting time of day of the volume copy of the volume to be used by the subsequent job on the basis of the calculated starting time of day of the subsequent job.

10. The data migration method according to claim 8, wherein in the first step, the data migration apparatus estimates an average value of execution time when the job was executed in the past, as the execution time of the job on the basis of a log of the job when executed in the past.

11. The data migration method according to claim 8, wherein in the third step, after the volume copy of the volume terminates, the data migration apparatus deletes the volume at the first cloud service.

12. The data migration method according to claim 4, wherein in the third step, after the execution of the job at the second cloud service terminates, the data migration apparatus deletes the volume used by the job.

13. The data migration method according to claim 8, wherein in the first step, the data migration apparatus estimates the execution time of the relevant job on the basis of a work transaction count regarding the volume.

14. The data migration method according to claim 8, wherein in the first step, the data migration apparatus:

acquires a data transfer amount per unit time for each time slot;

estimates volume copy time of each volume on the basis of the acquired data transfer amount per unit time for each time slot, the starting time of day of each job, and a volume size of each volume to be used by each job; and estimates volume copy time of each volume on the basis of the estimated volume copy time of each volume and the starting time of day of each job.

\* \* \* \* \*